United States Patent
Dehmel et al.

(10) Patent No.: US 9,145,039 B2
(45) Date of Patent: Sep. 29, 2015

(54) HEIGHT ADJUSTMENT FOR VEHICLES WITH AIR SPRING AND VIBRATION DAMPER

(71) Applicant: Ford Global Technologies, LLC, Dearborn, MI (US)

(72) Inventors: Matthias Dehmel, Pulheim (DE); Michael Johannes Frantzen, Aachen (DE); Michael Seemann, Koln (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 14/023,035

(22) Filed: Sep. 10, 2013

(65) Prior Publication Data

US 2014/0070467 A1 Mar. 13, 2014

(30) Foreign Application Priority Data

Sep. 10, 2012 (DE) .......................... 10 2012 215 973

(51) Int. Cl.
| | |
|---|---|
| *B60G 17/04* | (2006.01) |
| *B60G 17/044* | (2006.01) |
| *B60G 11/58* | (2006.01) |
| *B60G 17/08* | (2006.01) |
| *F16F 9/00* | (2006.01) |

(52) U.S. Cl.
CPC .............. *B60G 17/044* (2013.01); *B60G 11/58* (2013.01); *B60G 17/08* (2013.01); *F16F 9/00* (2013.01); *B60G 2500/30* (2013.01)

(58) Field of Classification Search
USPC ................. 280/5.514, 5.515, 6.157, 124.157, 280/124.16; 267/64.21, 64.24, 24.27
See application file for complete search history.

(56) References Cited

U.S. PATENT DOCUMENTS

| | | | | |
|---|---|---|---|---|
| 5,347,457 | A * | 9/1994 | Tanaka et al. .................... | 701/37 |
| 6,679,509 | B1 * | 1/2004 | Galazin et al. ......... | 280/124.116 |
| 6,898,501 | B2 * | 5/2005 | Schubert ......................... | 701/50 |
| 7,077,226 | B2 * | 7/2006 | Oliver et al. ............... | 180/89.12 |
| 7,624,995 | B2 * | 12/2009 | Barbison ..................... | 280/6.153 |
| 8,641,051 | B2 * | 2/2014 | Pavuk et al. ............... | 280/5.514 |
| 2007/0171036 | A1 * | 7/2007 | Nordmeyer .................. | 340/438 |
| 2007/0200304 | A1 * | 8/2007 | Brookes et al. ............ | 280/5.514 |
| 2008/0164089 | A1 * | 7/2008 | Brookes et al. ............... | 181/123 |
| 2008/0290617 | A1 * | 11/2008 | Bounds ......................... | 280/5.5 |
| 2012/0086178 | A1 * | 4/2012 | Brookes et al. ........... | 280/6.157 |
| 2014/0239606 | A1 * | 8/2014 | Koeske et al. ........... | 280/124.16 |

* cited by examiner

*Primary Examiner* — Toan To
(74) *Attorney, Agent, or Firm* — LeClairRyan

(57) ABSTRACT

The invention concerns a device for a vehicle, for height adjustment of a vehicle superstructure, which at one end has a first means for pivoting on a sprung mass (2) of the vehicle and at the other end a second means for pivoting on an unsprung mass (3) of the vehicle, a vibration damper (4) damping a relative movement of the sprung mass and unsprung masses (2, 3), and a self-pumping air spring (5) which supports the sprung and unsprung masses (2, 3) against each other in a sprung fashion. The vibration damper (4) according to the invention has a damping characteristic which is adjustable during operation, preferably steplessly adjustable. The invention also concerns a method for height adjustment of a vehicle superstructure by means of such a device.

20 Claims, 2 Drawing Sheets

HEIGHT ADJUSTMENT FOR VEHICLES WITH AIR SPRING AND VIBRATION DAMPER

TECHNICAL FIELD

The present invention concerns a device for vehicles, for height adjustment of a vehicle superstructure, according to the preamble of claim 1, and a method for height adjustment of a vehicle superstructure with such a device.

BACKGROUND OF THE INVENTION

Road vehicles with wheel suspension systems which contain an active or semi-active level or height adjustment system for the vehicle superstructure offer various benefits in comparison with vehicles with a passive wheel suspension. Thanks to a constant ground clearance, the driving behavior can be improved as the spring compression and extension movements of the wheels are independent of the vehicle load. Also it is possible for example, in city driving i.e. at low speeds, to raise the vehicle superstructure from the ground and hence increase the ground clearance in order for example to be able to drive without problems over road humps, curbstones or underground car park entrances with a high ramp angle. At higher drive speeds the vehicle superstructure can be lowered using the ride height adjustment system in order for example to reduce the drag of the vehicle. In vehicles, in particular in cars, the movements of the vehicle superstructure are normally mainly damped hydraulically, for example by means of passive shock and vibration dampers working with hydraulic oil. Furthermore hydraulic vibration dampers are also known, the damping characteristics of which can be altered during operation. The ride height adjustment systems currently available on the market for vehicles are relatively costly and have a high weight. In addition they require a large installation space and use relatively large quantities of energy for operation.

For example DE 10 2006 055 757 A1 discloses a self-pumping air spring and damper unit working with compressed air, with automatic ride height adjustment, for a vehicle chassis. The air spring and damper unit has a pump which is driven by the changing distance between the pivot points of the spring and damper unit on the vehicle superstructure and chassis respectively as a result of the spring compression and extension movements of the vehicle, and generates an increase in air pressure whereby the air spring and damper unit retains an established ride height when the load on the vehicle changes. The pump is substantially formed from two pump parts which are moveable relative to each other and reduce a compression chamber, of which one pump part is connected with the one pivot point and the other pump part with the other pivot point such that on the spring compression and extension movements of the vehicle, the changing distance between the pivot points is transmitted to the mutual spacing of the pump parts. The air spring and damper unit furthermore has a passive, pneumatic vibration damper formed by two spring chambers which contain compressed air and which can be connected via a throughflow choke valve, wherein the compressed air is exchanged between the spring chambers damped by the choke valves on the spring compression and extension movements of the vehicle. One of the spring chambers is delimited by a roller bellows which rolls on the contour of a rotationally symmetrical rolling cylinder. The compression chamber of the pump can be connected fluid-conductively with one of the spring chambers via a check valve so that on a compression stroke of the pump or on spring compression, air is pumped into a spring chamber by the pump. On spring extension, air is discharged from the spring chamber via a discharge device also provided, which substantially comprises a discharge cylinder and a discharge piston. The pump and the discharge device are matched to each other such that a constant vehicle height is always maintained irrespective of the vehicle load due to the spring compression and extension movements of the vehicle superstructure.

Furthermore DE 103 27 485 A1 discloses an active pneumatic suspension system for a motor vehicle with an air spring and a passive vibration damper. The air spring has a spring chamber filled with compressed air, wherein the compressed air can be compressed or expanded via a hydraulic fluid which can be pumped into the spring chamber, and is separated from the compressed air in the spring chamber by means of an elastic membrane. The hydraulic fluid is pumped by means of an electrically operated hydraulic pump from a hydraulic accumulator into the spring chamber and vice versa.

DE 100 34 603 A1 furthermore discloses a pneumatic air spring and damping element which has two spring chambers separated by a choke element, of which chambers at least one is variable in its volume. In the case that both spring chambers are variable in volume, an additional spring element in the form of a coil spring is connected in parallel with the air spring and damper element.

Furthermore DE 25 38 805 A1 discloses a vehicle wheel suspension with a telescopic shock absorber and a coil spring connected in parallel to the shock absorber, wherein a tubular flexible membrane element is provided outside the shock absorber to form a chamber of variable gas volume. To control the gas volume in the chamber, gas supply devices are provided for optional supply of a gas, for example compressed by means of a compressor, to and from the chamber.

DE 1 216 126 discloses a hydraulic telescopic shock absorber connected with a support suspension for vehicles, wherein the support suspension for example can be formed as coil springs or air springs arranged coaxially to the shock absorber. The support suspension load is supported via a moving wall on the damping fluid which is otherwise enclosed by solid walls on all sides.

In operation of the known self-pumping devices with an air spring which provides a height adjustment function, in general damping forces are generated by the pumping of air into and out of the spring chamber of the air spring via corresponding valves. In addition the spring stiffness of the air springs changes on a height adjustment process, under constant air pressure, as a result of pumping of air into and out of the spring chamber of the air spring. Both the temporary generation of additional damping forces and the change in spring stiffness as a function of ride height are undesirable as they can lead in particular to perceptible losses of driving comfort.

SUMMARY OF THE INVENTION

In this context the object of the present invention is to specify a device for a vehicle, for height adjustment of a vehicle superstructure, with a vibration damper and an air spring, and a method for height adjustment of the vehicle superstructure which overcomes the above disadvantages. In addition the device is constructed particularly compactly and can be operated with as little externally supplied energy as possible.

This object is achieved by a device for height adjustment of a vehicle superstructure with the features of claim 1 and by a method for height adjustment with the features of claim 9.

Further particularly advantageous embodiments of the invention are disclosed by the respective subclaims.

It is pointed out that the features listed individually in the description below can be combined with each other in any arbitrary, technically sensible manner and constitute further embodiments of the invention. The description characterizes and specifies the invention further, in particular in connection with the figures.

According to the invention a device for a vehicle, in particular a motor vehicle, for height adjustment of a vehicle superstructure, at one end has a first means for pivoting on a sprung mass of the vehicle, for example the vehicle superstructure, and at the other end a second means for pivoting on an unsprung mass of the vehicle, for example a wheel suspension or wheel suspension part. The pivoting means can be constructed in any suitable form which allows (articulated) mounting of the device on the sprung and/or unsprung mass of the vehicle, for example in the form of rubber-metal bearings known in themselves. Furthermore the device according to the invention has a vibration damper damping a relative movement between the sprung and unsprung masses, and a self-pumping air spring which supports the sprung and unsprung masses against each other in a sprung fashion. The term "self-pumping" in the sense of the present invention means that a height adjustment function of the air spring is supplied substantially only from the kinetic energy of the relative movement of the sprung and unsprung masses, and for the height adjustment process substantially no or only very little external energy need be supplied from the outside. Such a height adjustment is also referred to below as semi-active height adjustment.

According to the invention the vibration damper has a damping characteristic which is adjustable during operation, preferably steplessly adjustable. The damping characteristic adjustable during operation of the vibration damper allows a targeted change in the damping capacity of the vibration damper depending on the momentary operating state of the air spring. Thus it is preferred for example to reduce the damping of the vibration damper temporarily as long as damping forces are generated in the air spring by the pumping of air into and/or out of the air spring, in order in this way to keep the overall damping of the device according to the invention substantially constant. Also increasing or reducing the damping of the vibration damper is advantageous if the vehicle ride height and hence the total spring stiffness of the air spring is increased or reduced by the pumping of air into or out of the air spring, in order in this way to achieve an optimum balance between the damping and spring forces provided by the individual force elements of the device according to the invention. Thus with the device according to the invention, the additional damping and/or spring forces generated in the air spring on the self-pumping height adjustment can be balanced or matched to each other such that there is no longer any perceptible loss of driving comfort. Also the device can be integrated in a single component so that a particularly compact device is achieved, saving installation space, for height adjustment of the vehicle superstructure.

An advantageous embodiment of the invention provides that the steplessly adjustable vibration damper is connected in parallel to the air spring. This means that the vibration damper can be pivotable on the sprung mass of the vehicle, for example by means of pivoting means provided at one end, and pivotable on the unsprung mass of the vehicle by means of pivoting means provided at its other end. In this way furthermore a compact construction of the device according to the invention is achieved, in particular in a longitudinal direction, but for example it also allows the physically separate arrangement of the vibration damper and self-pumping air spring.

Evidently also on a parallel arrangement of the vibration damper to the air spring, a device integrated in one component is possible with a common pivoting means for pivoting on the sprung mass of the vehicle and/or a common pivoting means for pivoting on the unsprung mass of the vehicle.

In a further advantageous embodiment of the invention the steplessly adjustable vibration damper is a hydraulic twin-tube damper. This has an outer tube and an inner tube arranged coaxially in the outer tube with an inner tube floor protruding into the outer tube, wherein in the inner tube is mounted an axially displaceable damper piston connected with a piston rod. At least one switchable, in particular electrically switchable, choke valve is provided on the damper piston. Furthermore at least one floor valve is provided in the inner tube floor. The inner tube is filled with a damping fluid, for example hydraulic oil, and the volume between an outside of the inner tube and an inside of the outer tube is filled partly with the damping fluid, for example hydraulic oil, and partly with a gas. The corresponding switchable valves are preferably switched by an electronic control device which furthermore can also monitor or detect the current operating state of the device according to the invention and/or further operating parameters of the vehicle by means of suitable sensors.

To support the spring force of the self-pumping air spring, a further advantageous embodiment of the invention provides a coil spring which acts parallel to the air spring and supports the sprung and unsprung masses against each other in a sprung fashion, and which is arranged surrounding the air spring on the outer periphery for an advantageous, compact construction.

According to a further advantageous embodiment of the invention the air spring has at least one spring chamber which can be filled with compressed air and is at least partly delimited by a moving wall, for example in the form of a roller bellows, and a pump chamber which is delimited by a pump cylinder and a pump piston axially displaceable therein. In this embodiment the pump cylinder rests on the sprung mass and the pump piston on the unsprung mass. Also the pump cylinder can rest on the sprung mass and the pump piston on the unsprung mass. Furthermore the spring chamber can be connected fluid-conductively with the pump chamber via at least one switchable, in particular electrically switchable, connecting valve and the pump chamber can be connected with the surrounding atmosphere via at least one switchable, in particular electrically switchable, connecting valve. The corresponding switchable valves are preferably switched by the above electronic control device which in addition can also monitor or detect the current operating state of the device according to the invention and/or further operating parameters of the vehicle by means of suitable sensors.

Thus the self-pumping air spring, for example when the connecting valve between the surrounding atmosphere and pump chamber is fully opened and the connecting valve between the spring chamber and the pump chamber is closed, can be operated as a conventional air spring which provides primarily spring forces. Because of the closed connection valve between the spring chamber and pump chamber, no compressed air can escape into the pump cylinder or pump chamber from the spring chamber which is delimited by the moving wall and filled with compressed air, and conversely no air can enter in the spring chamber of the air spring from the pump chamber of the pump cylinder through the closed connecting valve between the spring chamber and pump chamber.

An operating mode which is semi-active, i.e. with a self-pumping air spring in which the air spring provides, as well as spring forces, also a height adjustment function, can be achieved in that the connecting valve between the valve cylinder and spring chamber and the connecting valve between the pump chamber of the pump cylinder and the surrounding atmosphere are switched as described below, depending on the momentary movement direction of the sprung and unsprung masses in relation to each other i.e. the spring compression or extension movement.

For example to raise the vehicle superstructure relative to the unsprung mass of the vehicle i.e. to enlarge the distance between the sprung mass and the unsprung masses of the vehicle, the connecting valve between the spring chamber and pump chamber is switched closed during the spring extension movement i.e. when the distance between the sprung and unsprung masses is increasing, while the connecting valve between the surrounding atmosphere and the pump chamber is switched at least partly open. Consequently air is drawn from the surrounding atmosphere into the pump cylinder as the pump cylinder is connected with one of the sprung or unsprung masses, and the pump piston via the piston rod with the other, and the distance between the two masses is increased on spring extension. During the spring compression movement i.e. when the distance between the sprung and unsprung masses is reduced, the connecting valve between the surrounding atmosphere and the pump chamber is switched closed and the connecting valve between the spring chamber and pump chamber is switched at least partly open so that air is pumped into the spring chamber from the pump cylinder or the pump chamber, which can be connected fluid-conductively with the spring chamber via the connecting valve between the spring chamber and pump chamber, whereby the air pressure in the spring chamber first increases and consequently the vehicle superstructure (sprung mass) is raised relative to the unsprung mass. Thus to raise the sprung mass relative to the unsprung mass of the vehicle, substantially only the vibration energy or movement dynamic of the relative movement of the sprung and unsprung masses is used. A supply of external energy for height adjustment of the vehicle superstructure is required only to switch the switchable valves in the device according to the invention.

To reduce the height for example of the vehicle superstructure relative to the unsprung mass of the vehicle, i.e. to reduce the distance between the sprung mass of the vehicle and the unsprung mass of the vehicle, the connecting valve between the spring chamber and pump chamber is switched at least partly open during the spring extension movement i.e. when the distance between the sprung and unsprung masses is increasing, while the connecting valve between the surrounding atmosphere and the pump chamber is switched closed. Consequently air is drawn from the spring chamber into the pump cylinder as the pump cylinder is connected with the one of the sprung or unsprung masses and the pump piston via the piston rod with the other, and the distance between these two masses is increased on spring extension. During the spring compression movement i.e. when the distance between the sprung and unsprung masses is reduced, the connecting valve between the surrounding atmosphere and the pump chamber is switched at least partly open and the connecting valve between the spring chamber and pump chamber is switched closed, so that air is pumped into the surrounding atmosphere from the pump cylinder or pump chamber which can be connected with the surrounding atmosphere via the connecting valve between the surrounding atmosphere and the pump chamber. By this pumping process, the air pressure in the spring chamber is reduced and the vehicle superstructure (sprung mass) falls relative to the unsprung masses. Thus to lower the sprung mass relative to the unsprung masses of the vehicle, substantially only the vibration energy or movement dynamic of the relative movement of sprung and unsprung masses is used. A supply of external energy to adjust the height of the vehicle superstructure is required only to switch the switchable valves in the device according to the invention.

As already stated, the connecting valve between the spring chamber and pump chamber, and the connecting valve between the surrounding atmosphere and pump chamber, are suitably switched by means of an electronic control device as a function of the desired operating mode of the device according to the invention or of the self-pumping air spring and the momentary spring compression or extension movement.

A further advantageous embodiment of the invention provides that the moving wall is formed as a roller bellows, wherein the roller bellows rolls at least partly on an outer periphery of a first rotationally symmetrical first body, formed for example as a roller cylinder, which is in connection with one of the sprung or unsprung masses. This design allows a comfortable springing of the device according to the invention.

To further improve the springing properties of the device according to the invention, a further embodiment of the invention furthermore proposes that the roller bellows rolls at least partly on an inner periphery of a rotationally symmetrical, hollow second body which is in connection with the other of the sprung or unsprung masses. So the second body can for example be formed as guide sleeve for the moving wall, in particular the moving wall formed as a roller bellows, wherein the first body, for example a roller cylinder, is arranged at least partly in the interior of the second body coaxial thereto, in particular in such a manner as to save construction space.

A method according to the invention for height adjustment of a vehicle superstructure by means of a device formed according to one of the embodiments described above provides that the damping of the vibration damper is temporarily reduced as long as damping forces are generated in the air spring by the pumping of air into and/or out of the air spring, and/or that the damping of the vibration damper is increased or reduced when the total length of the air spring, and because of a constant pressure consequently the total spring stiffness of the air spring, is increased or reduced by the pumping of air into and/or out of the air spring. In this way an optimum balance can be achieved between the damping and spring forces provided by the device for height adjustment according to the invention. In particular with the method according to the invention, the additional damping and/or spring forces generated in the air spring with the self-pumping height adjustment can be balanced and/or matched to each other such that there are no more perceptible losses of driving comfort.

The above advantages and other advantages and features will be readily apparent from the following detailed description of the preferred embodiments when taken in connection with the accompanying drawings.

BRIEF DESCRIPTION OF THE DRAWINGS

Further advantageous details and effects of the invention are explained in more detail below with reference to an embodiment example shown in the figures. These show.

In the different figures the same parts always carry the same reference numerals so that these are usually only described once.

DETAILED DESCRIPTION OF THE PREFERRED EMBODIMENTS

Figure 1:
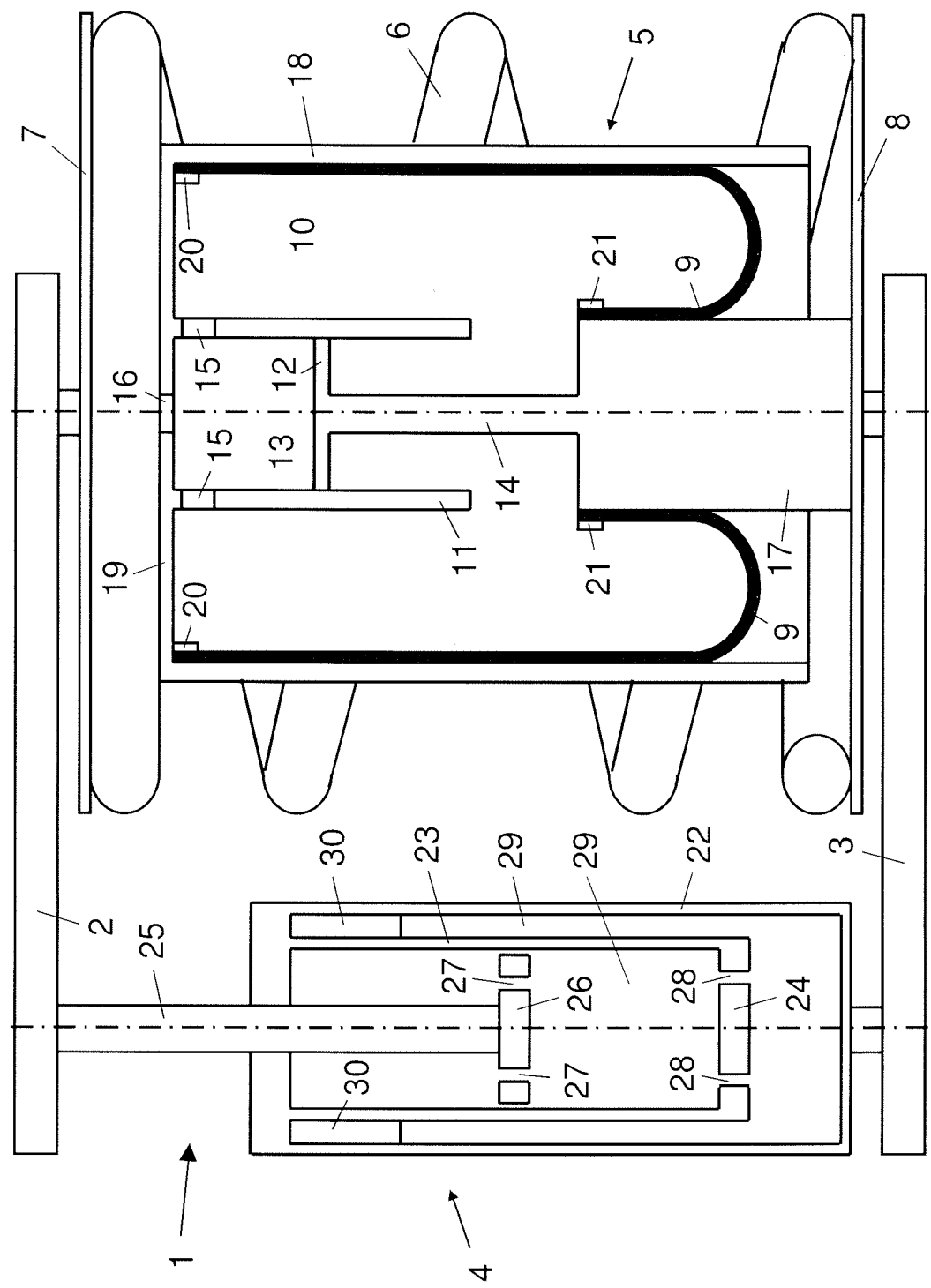
FIG. 1 a side view, partly in cross section, of a device according to the invention for height adjustment, and FIG. 2 a block diagram of the device shown in FIG. 1 with a control device.

In the attached figure the same reference numerals will be used to refer to the same components. In the following description various operating parameters and components are described for different constructed embodiments. These specific parameters and components are included as examples and are not meant to be limiting.

FIG. 1 shows, largely in a cross section view, a side view of a device 1 according to the invention for height adjustment of a sprung mass 2, for example a vehicle superstructure, relative to an unsprung mass 3, for example parts of a wheel suspension or wheel suspension part, of a vehicle not shown in more detail in FIG. 1. As evident from FIG. 1, the device 1 has a vibration damper 4 damping a relative movement of the sprung and unsprung masses 2, 3 and a self-pumping air spring 5 which provides a semi-active height adjustment function and supports the sprung and unsprung masses 2, 3 against each other in a sprung fashion. Both the air spring 5 and the vibration damper 4, which in the embodiment example shown in FIG. 1 are connected in parallel to each other between the sprung and unsprung masses 2, 3, have a first means, not shown in detail in FIG. 1, for pivoting on the sprung mass 2 and a second means, also not shown in detail, for pivoting on the unsprung mass 3. The respective pivoting means can be constructed in any form which allows (articulated) pivoting of the vibration damper 4 or air spring 5 on the sprung and unsprung masses 2, 3. For example they can be formed as rubber-metal bearings.

In the device 1 shown in FIG. 1, the vibration damper 4 has a damping characteristic which is adjustable during operation, preferably steplessly adjustable. The adjustable damping characteristic allows a targeted change in the damping capacity of the vibration damper 4 depending on the momentary operating state of the air spring 5. Thus for example it is preferred to reduce the damping of the vibration damper 4 temporarily as long as damping forces are generated in the air spring 5 by the pumping of air into and/or out of the air spring 5, as will be described in more detail below, in order in this way to keep the total damping of the device 1 according to the invention substantially constant. Also an increase or reduction in damping of the vibration damper 4 is advantageous if the total length and hence the total spring stiffness of the air spring 5 is increased or reduced by the pumping of air into and/or out of the air spring 5, in order in this way to achieve an optimum balance between the damping and spring forces provided by device 1 according to the invention. Thus with the device 1 according to the invention, the additional damping and/or spring forces generated in the air spring 5 on the self-pumping height adjustment described below are balanced or matched to each other such that there are no longer any perceptible losses of driving comfort.

In the device 1 shown in FIG. 1, the air spring 5 is furthermore surrounded by a coil spring 6 with several windings which acts in parallel to the air spring 5 and supports the sprung and unsprung masses 2, 3 against each other in a sprung fashion. The coil spring 6 surrounds the air spring 5 on the outer periphery and thus allows a particularly compact design, saving construction space, of the combination of air spring 5 and coil spring 6. The windings describe a helix in a known manner.

As further evident from FIG. 1, the coil spring 6 is clamped between an upper spring plate 7, for example in connection with the sprung mass 2, and a lower spring plate 8, for example in connection with the unsprung mass 3. The coil spring 6 serves in the known manner, in addition to the air spring 5, for sprung support of the sprung and unsprung masses 2, 3 of the vehicle which are moveable relative to each other.

As furthermore evident from FIG. 1, the air spring 5 has at least one spring chamber 10 which can be filled with compressed air and is at least partly delimited by a moving wall 9. In the embodiment example shown in FIG. 1 of the device 1 according to the invention, the moving wall 9 is formed as a roller bellows. The spring chamber 10 supports the sprung and unsprung masses 2, 3 of the vehicle against each other in a sprung fashion. Furthermore the self-pumping air spring 5 has a pump chamber 13 which is delimited by the pump cylinder 11 and a pump piston 12 axially displaceable therein. In the embodiment example shown in FIG. 1, the pump cylinder 11 rests on the sprung mass 2 and the pump piston 12 rests on the unsprung mass 3 via a piston rod 14. As evident from FIG. 1, the pump cylinder 11 of the self-pumping air spring 5 is open towards the bottom i.e. in the direction of the unsprung mass 3. The spring chamber 10 is however separated fluid-tight from the pump chamber 13 by the pump piston 12. The spring chamber 10 can be connected fluid-conductively with the pump chamber 13 only via at least one switchable, in particular electrically switchable, connecting valve 15 arranged in the pump cylinder 11. The pump chamber 13 can also be connected with the surrounding atmosphere via at least one switchable, in particular electrically switchable, connecting valve 16.

For optimum spring comfort of the air spring 5, the moving wall 9 or the roller bellows 9—as shown in FIG. 1—rolls at least partly on an outer periphery of a rotationally symmetrical first body 17 which is in connection with one of the sprung or unsprung masses 2 or 3. The body 17 in the embodiment example shown in FIG. 1 is formed as a rotationally symmetrical roller cylinder and rests on the unsprung mass 3. Furthermore a rotationally symmetrical, hollow second body 18 is provided which is in connection with the sprung mass 2 and, in the embodiment example of the device 1 shown, is formed as a guide sleeve for the moving wall 9, and on the inner periphery of which the roller bellows 9 rolls at least partly. As shown in FIG. 1, the guide sleeve 18 at its upper end is closed by means of a closing plate 19 extending substantially perpendicular to the longitudinal axis of the air spring 5. Via this closing plate 19, the guide sleeve 18 is in connection with the sprung mass 2. As also shown in FIG. 1, the connecting valve 16 is arranged in the closing plate 19 in the embodiment example shown of the device 1. It is also evident from FIG. 1 that the first body 17, in the embodiment example of the device 1 shown, is arranged at least partly inside the second body 18 and coaxial thereto, in particular in such a manner as to save construction space. The roller bellows 9 at its upper end is held via a corresponding first fixing means 20, for example a clamping ring, on the inner periphery of the guide sleeve 18 and at its lower end via a second fixing means 21, for example also a clamping ring, on the outer periphery of the roller cylinder 17.

As further shown in FIG. 1, the steplessly adjustable vibration damper 4 of the device 1 is a hydraulic twin-tube damper. This has an outer tube 22 and an inner tube 23 arranged coaxially in the outer tube 22, with an inner tube floor 24 protruding into the outer tube 22, wherein in the inner tube 23 is mounted an axially displaceable damper piston 26 connected with the piston rod 25. At least one switchable, in particular electrically switchable, choke valve 27 is provided on the damper piston 26. Furthermore at least one floor valve 28 is provided in the inner tube floor 24. The inner tube 23 is filled with a damping fluid 29, for example hydraulic oil, and the volume between an outside of the inner tube 23 and an inside of the outer tube 22 is filled partly with the damping fluid 29, for example hydraulic oil, and partly with a gas 30. The function of a hydraulic twin-tube damper 4 equipped with a gas cushion is known in itself.

The connecting valves 15, the connecting valve 16 and the choke valves 27 in the embodiment example shown are each electrically switchable valves. These are switched by means of an electronic control device 31 shown in FIG. 2, depending on the desired operating mode of the device 1 and depending on the momentary movement direction i.e. the spring compression or extension movement of the device 1. The control device 31 can in addition monitor or detect the current operating mode of the device 1 according to the invention and/or further operating parameters of the vehicle by means of suitable sensors.

Thus the device 1 according to the invention can be operated as a simple air spring without height adjustment function, for example when connecting valve 16 is fully open and connecting valves 15 are closed. Because of the closed connection valves 15, no compressed air can escape into the two pump cylinder 11 or pump chamber 13 from the spring chamber 10 delimited by the moving wall 9 and filled with compressed air, and conversely no air can enter the spring chamber 10 from the pump chamber 13 of the pump cylinder 11 through the closed connecting valves 15.

A damping of the device 1 according to the invention is achieved if the choke valves 27 are at least partly opened such that energy from the damping fluid 29 flowing through the choke valve 27 on the spring compression and extension movement because of the movement of the damper piston 26 in the inner tube 23, is dissipated. The device 1 according to the invention can thus provide spring and damping forces simultaneously.

An operating mode of the device 1 with semi-active, i.e. self-pumping height adjustment, in which the device 1 provides, as well as spring and damper forces, also a height adjustment function, can be achieved in that the connecting valves 15 between the pump chamber 13 and the spring chamber 10, and the connecting valve 16 between the pump chamber 13 of the pump cylinder 11 and the surrounding atmosphere, are switched as described below depending on the momentary movement direction i.e. the spring compression or extension movement of the device For example to raise the vehicle superstructure relative to the unsprung mass of the vehicle i.e. to increase the distance between the sprung mass 2 of the vehicle and the unsprung mass 3 of the vehicle, during the spring extension movement i.e. when the distance between the sprung and unsprung masses 2 and 3 is increased, the connecting valves 15 are switched closed while the connecting valve 16 is switched at least partly open. Consequently air from the surrounding atmosphere is drawn into the pump cylinder 11 as the pump cylinder 11 is connected with the one of the sprung or unsprung masses 2 or 3 and the pump piston 12 via the piston rod 14 with the other, and the distance between these two masses 2 and 3 is increased on spring extension. During the spring compression movement i.e. when the distance between the sprung and unsprung masses 2 and 3 is reduced, the connecting valve 16 is switched closed and the connecting valves 15 are switched at least partly open so that air is pumped into the spring chamber 10 from the pump cylinder 11 or the pump chamber 13 which can be connected fluid-conductively with the spring chamber 10 via the connecting valves 15, whereby the air pressure in the spring chamber 10 is first temporarily increased and then for example the vehicle superstructure (sprung mass 2) is raised relative to the wheel suspension (unsprung mass 3). Thus to raise the sprung mass 2 relative to the unsprung mass 3 of the vehicle, substantially only the vibration energy or movement dynamic of the relative movement of the sprung and unsprung masses 2 and 3 is used. A supply of external energy for height adjustment of the vehicle superstructure is required only to switch the switchable valves 15, 16 and 27 in the device according to the invention.

To reduce the height of the vehicle superstructure relative to the unsprung masses of the vehicle i.e. to reduce the distance between the sprung mass 2 of the vehicle and the unsprung mass 3 of the vehicle, during the spring extension movement i.e. when the distance between the sprung and unsprung masses 2 and 3 is increased, the connecting valves 15 are switched at least partly open while the connecting valve 16 is switched closed. Consequently air is drawn from the spring chamber 10 into the pump cylinder 11 as the pump cylinder 11 is connected with the one of the sprung or unsprung masses 2 or 3 and the pump piston 12 via the piston rod 14 with the other, and the distance between the two masses 2 and 3 is increased on spring extension. During the spring compression movement i.e. when the distance between the sprung and unsprung masses 2 and 3 is reduced, the connecting valve 16 is switched at least partly open and the connecting valves 15 are switched closed so that air is pumped into the surrounding atmosphere from the pump cylinder 11 or the pump chamber 13 which can be connected with the surrounding atmosphere via the connecting valve 16. By this pumping process, first temporarily the air pressure in the spring chamber 10 is reduced and the vehicle superstructure (sprung mass 2) then falls relative to the wheel suspension (unsprung mass 3). Thus to lower the sprung mass 2 relative to the unsprung mass 3 of the vehicle, substantially only the vibration energy or movement dynamic of the relative movement of the sprung and unsprung masses 2 and 3 is used. A supply of external energy for height adjustment of vehicle superstructure is required only to switch the switchable valves 15, 16 and 27 in the device according to the invention.

Figure 2:
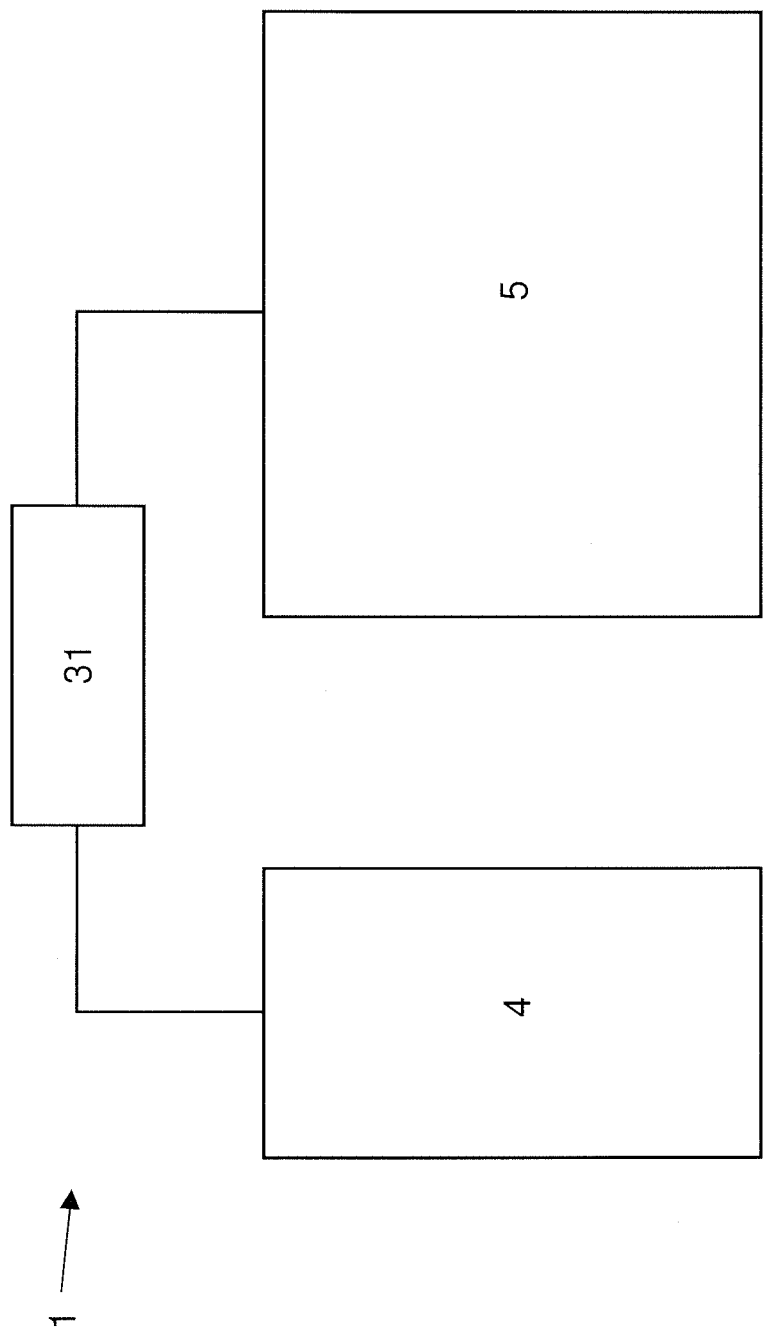

Since in the switching processes described above in particular of valves 15 and 16 for height adjustment, the spring stiffness of the air spring 5 is changed and additional damping forces are generated by the air spring 5, the process performed by the control device 31 shown in FIG. 2 for height adjustment of the vehicle superstructure provides, inter alia, that the damping of the vibration damper 4 is reduced temporarily by corresponding switching of the choke valves 27 as long as damping forces are generated in the air spring 5 by the pumping of air into and/or out of the air spring 5, and/or the damping of the vibration damper 4 is increased or reduced by corresponding switching of the choke valves 27 when the total spring stiffness of the air spring 5 is increased or reduced by the pumping of air into or out of the air spring 5. Thus with the device 1 according to the invention, the additional damping and/or spring forces generated in the air spring 5 on the self-pumping height adjustment are balanced or matched to each other such that there are no longer any perceptible losses of driving comfort.

The device according to the invention described above for height adjustment of a vehicle superstructure is not restricted to the embodiment disclosed herein but comprises also other embodiments with similar function. In particular the number and arrangement of switchable connecting valves is not restricted to the embodiment example described here.

In a preferred embodiment, the device according to the invention and the method according to the invention are used in a vehicle, in particular a motor vehicle, for height adjustment of the vehicle superstructure (sprung mass) relative to parts of the wheel suspension (unsprung mass).

LIST OF REFERENCE NUMERALS

1 Device for height adjustment
2 Sprung mass
3 Unsprung mass
4 Vibration damper
5 Air spring
6 Coil spring
7 Spring plate
8 Spring plate
9 Moving wall, roller bellows
10 Spring chamber
11 Pump cylinder
12 Pump piston
13 Pump chamber
14 Piston rod
15 Connecting valve
16 Connecting valve
17 Rotationally symmetrical first body, roller cylinder
18 Rotationally symmetrical, hollow second body, guide sleeve
19 Closing plate
20 First fixing means, clamping ring
21 Second fixing means, clamping ring
22 Outer tube
23 Inner tube
24 Inner tube floor
25 Piston rod
26 Damper piston
27 Choke valve
28 Floor valve
29 Damper fluid, hydraulic oil
90 Gas
31 Control device

The invention claimed is:

1. A device for a vehicle, for height adjustment of a vehicle superstructure, which at one end has a first means for pivoting on a sprung mass (2) of the vehicle and at the other end a second means for pivoting on an unsprung mass (3) of the vehicle, a vibration damper (4) damping a relative movement of the sprung mass and unsprung masses (2, 3), and a self-pumping air spring (5) which supports the sprung and unsprung masses (2, 3) against each other in a sprung fashion, wherein the vibration damper (4) has a damping characteristic which is adjustable during operation, preferably steplessly adjustable, and wherein a coil spring (6) acts parallel to the air spring (5) and supports the sprung and unsprung masses (2, 3) against each other in a sprung fashion and is arranged surrounding the air spring (5) on the outer periphery.

2. The device as claimed in claim 1, wherein the steplessly adjustable vibration damper (4) is connected in parallel to the air spring (5).

3. The device as claimed in claim 2, wherein the steplessly adjustable vibration damper (4) is a hydraulic twin-tube damper which has an outer tube (22) and an inner tube (23) arranged coaxially in the outer tube (22) with an inner tube floor (24) protruding into the outer tube (22), wherein in the inner tube (23) is mounted an axially displaceable damper piston (26) connected with a piston rod (25), wherein at least one switchable choke valve (27) is provided on the damper piston (26) and at least one floor valve (28) is provided in the inner tube floor (24), and the inner tube (23) is filled with a damping fluid (29) and the volume between an outside of the inner tube (23) and an inside of the outer tube (22) is filled partly with the damping fluid (29) and partly with a gas (30).

4. The device as claimed in claim 2, wherein a coil spring (6) acts parallel to the air spring (5) and supports the sprung and unsprung masses (2, 3) against each other in a sprung fashion and is arranged surrounding the air spring (5) on the outer periphery.

5. The device as claimed in claim 2, wherein the air spring (5) has at least one spring chamber (10) which can be filled with compressed air and is at least partly delimited by a moving wall (9), and a pump chamber (13) which is delimited by a pump cylinder (11) and a pump piston (12) axially displaceable therein, wherein the pump cylinder (11) rests on the sprung mass (2) and the pump piston (12) on the unsprung mass (3) or vice versa, wherein furthermore the spring chamber (10) can be connected fluid-conductively with the pump chamber (13) via at least one switchable connecting valve (15) and the pump chamber (13) can be connected with the surrounding atmosphere via at least one switchable connecting valve (16).

6. The device as claimed in claim 2, wherein a moving wall (9) formed as a roller bellows, wherein the roller bellows rolls at least partly on an outer periphery of a rotationally symmetrical first body (17) which is in connection with one of the sprung or unsprung masses (2, 3).

7. The device as claimed in claim 1, wherein the steplessly adjustable vibration damper (4) is a hydraulic twin-tube damper which has an outer tube (22) and an inner tube (23) arranged coaxially in the outer tube (22) with an inner tube floor (24) protruding into the outer tube (22), wherein in the inner tube (23) is mounted an axially displaceable damper piston (26) connected with a piston rod (25), wherein at least one switchable choke valve (27) is provided on the damper piston (26) and at least one floor valve (28) is provided in the inner tube floor (24), and the inner tube (23) is filled with a damping fluid (29) and the volume between an outside of the inner tube (23) and an inside of the outer tube (22) is filled partly with the damping fluid (29) and partly with a gas (30).

8. The device as claimed in claim 7, wherein a coil spring (6) acts parallel to the air spring (5) and supports the sprung and unsprung masses (2, 3) against each other in a sprung fashion and is arranged surrounding the air spring (5) on the outer periphery.

9. The device as claimed in claim 7, wherein the air spring (5) has at least one spring chamber (10) which can be filled with compressed air and is at least partly delimited by a moving wall (9), and a pump chamber (13) which is delimited by a pump cylinder (11) and a pump piston (12) axially displaceable therein, wherein the pump cylinder (11) rests on the sprung mass (2) and the pump piston (12) on the unsprung mass (3) or vice versa, wherein furthermore the spring chamber (10) can be connected fluid-conductively with the pump chamber (13) via at least one switchable connecting valve (15) and the pump chamber (13) can be connected with the surrounding atmosphere via at least one switchable connecting valve (16).

10. The device as claimed in claim 7, wherein a moving wall (9) formed as a roller bellows, wherein the roller bellows rolls at least partly on an outer periphery of a rotationally symmetrical first body (17) which is in connection with one of the sprung or unsprung masses (2, 3).

11. The device as claimed in claim 1, wherein the air spring (5) has at least one spring chamber (10) which can be filled with compressed air and is at least partly delimited by a moving wall (9), and a pump chamber (13) which is delimited by a pump cylinder (11) and a pump piston (12) axially displaceable therein, wherein the pump cylinder (11) rests on the sprung mass (2) and the pump piston (12) on the unsprung mass (3) or vice versa, wherein furthermore the spring chamber (10) can be connected fluid-conductively with the pump chamber (13) via at least one switchable connecting valve (15) and the pump chamber (13) can be connected with the surrounding atmosphere via at least one switchable connecting valve (16).

12. The device as claimed in claim 11, wherein a moving wall (9) formed as a roller bellows, wherein the roller bellows rolls at least partly on an outer periphery of a rotationally symmetrical first body (17) which is in connection with one of the sprung or unsprung masses (2, 3).

13. The device as claimed in claim 1, wherein a moving wall (9) formed as a roller bellows, wherein the roller bellows rolls at least partly on an outer periphery of a rotationally symmetrical first body (17) which is in connection with one of the sprung or unsprung masses (2, 3).

14. The device as claimed in claim 13, wherein the roller bellows rolls at least partly on an inner periphery of a rotationally symmetrical, hollow second body (18) which is in connection with the other of the sprung or unsprung masses (2, 3).

15. The device as claimed in claim 13, wherein the second body (18) is formed as a guide sleeve for the moving wall (9) and the first body (17) is arranged at least partly in the interior of the second body (18) and coaxial thereto.

16. The device as claimed in claim 14, wherein the second body (18) is formed as a guide sleeve for the moving wall (9) and the first body (17) is arranged at least partly in the interior of the second body (18) and coaxial thereto.

17. A method for height adjustment of a vehicle superstructure by means of a device as claimed claim 1, comprising:
    a temporary reduction in damping of the vibration damper (4) as long as damping forces are generated in the air spring (5) by the pumping of air into and/or out of the air spring (5), and/or
    an increase or reduction in the damping of the vibration damper (4) when the total spring stiffness of the air spring (5) is increased or reduced by the pumping of air into or out of the air spring (5).

18. The device as claimed in claim 1, wherein the air spring (5) has at least one spring chamber (10) which can be filled with compressed air and is at least partly delimited by a moving wall (9), and a pump chamber (13) which is delimited by a pump cylinder (11) and a pump piston (12) axially displaceable therein, wherein the pump cylinder (11) rests on the sprung mass (2) and the pump piston (12) on the unsprung mass (3) or vice versa, wherein furthermore the spring chamber (10) can be connected fluid-conductively with the pump chamber (13) via at least one switchable connecting valve (15) and the pump chamber (13) can be connected with the surrounding atmosphere via at least one switchable connecting valve (16).

19. The device as claimed in claim 1, wherein a moving wall (9) formed as a roller bellows, wherein the roller bellows rolls at least partly on an outer periphery of a rotationally symmetrical first body (17) which is in connection with one of the sprung or unsprung masses (2, 3).

20. A device for a vehicle, for height adjustment of a vehicle superstructure, which at one end has a first means for pivoting on a sprung mass (2) of the vehicle and at the other end a second means for pivoting on an unsprung mass (3) of the vehicle, a vibration damper (4) damping a relative movement of the sprung mass and unsprung masses (2, 3), and a self-pumping air spring (5) which supports the sprung and unsprung masses (2, 3) against each other in a sprung fashion, wherein the vibration damper (4) has a damping characteristic which is adjustable during operation, preferably steplessly adjustable, wherein a moving wall (9) formed as a roller bellows, wherein the roller bellows rolls at least partly on an outer periphery of a rotationally symmetrical first body (17) which is in connection with one of the sprung or unsprung masses (2, 3), and wherein the roller bellows rolls at least partly on an inner periphery of a rotationally symmetrical, hollow second body (18) which is in connection with the other of the sprung or unsprung masses (2, 3).

* * * * *